June 16, 1931.  L. D. WALDEN  1,810,233
DASHPOT
Filed June 4, 1928
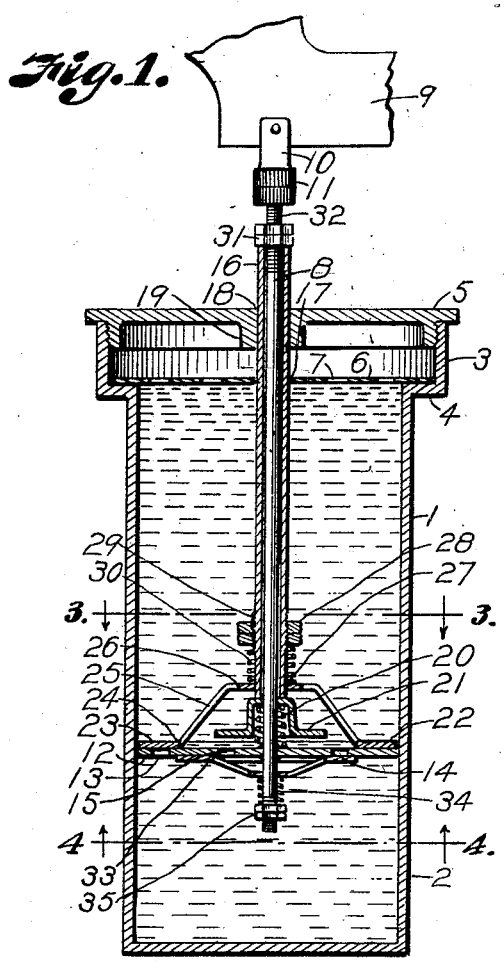
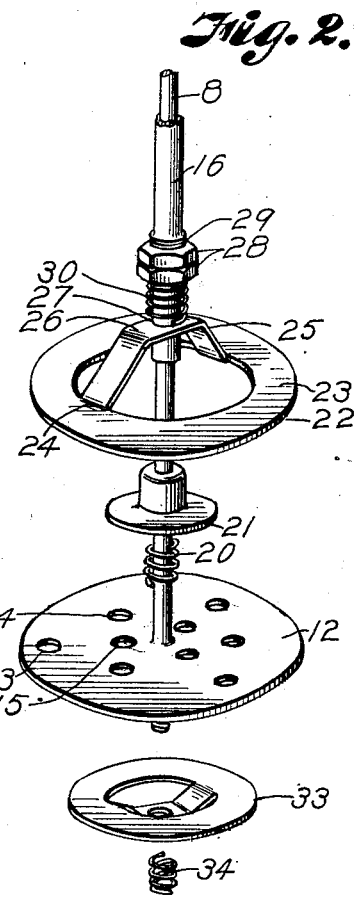
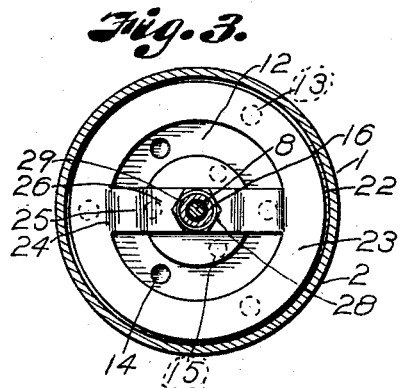
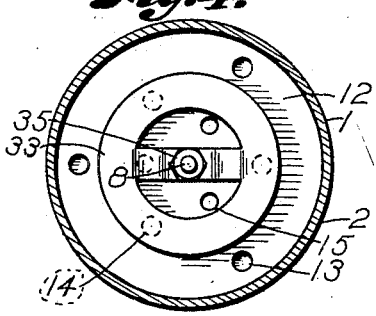
INVENTOR.
Lerna D. Walden.
BY Arthur C. Brown
ATTORNEY Patented June 16, 1931

1,810,233

UNITED STATES PATENT OFFICE

LERNA D. WALDEN, OF KANSAS CITY, KANSAS

DASHPOT

Application filed June 4, 1928. Serial No. 282,587.

My invention relates to shock absorbers and more particularly to dash pots such as applied to weighing apparatus, or the like, the principal objects being to hasten the stabilization of weighing apparatus and reduce the time necessary for ascertaining the weight after an article has been placed on the scales. Further objects are to check the plunger of a dash pot device at the beginning and end of each stroke, to permit relatively free movement of the plunger over the greater portion of the path, and to assure the repose of the plunger at the suitable position for correct indication of weight by the scales.

In accomplishing these and other objects of the invention I have provided improved details of structure, the preferred forms of which are illustrated in the accompanying drawings, wherein:

Fig. 1 is a vertical central sectional view of the device applied to a scale member shown fragmentarily.

Fig. 2 is an enlarged detail perspective view of operative members of the device shown separated.

Fig. 3 is a cross section of the device on the line 3—3, Fig. 1.

Fig. 4 is a section on the line 4—4, Fig. 1.

Referring in detail to the drawings:

1 designates a dash pot adapted for support in fixed relation with weighing apparatus not shown, and comprising a fluid-containing cylinder 2 having an enlarged upper end 3 constituting a rim and producing a shoulder 4, and a cap or cover 5 screw-threadedly engaged with the rim. A splash disk 6 provided with apertures 7 is supported by the shoulder 4.

A piston rod 8 is adapted to be connected to a movable member 9 such as a stem of a weighing apparatus by a coupling 10, and locked against rotation by a nut 11, the rod extending into the cylinder and having a piston disk 12 fixed to its lower portion adjacent its lower end. The piston disk is provided with radially spaced series of ports 13, 14 and 15, and the movement of liquid through the ports is controlled by means presently described.

A sleeve-like tubular valve support 16 extends slidably over the intermediate portion of the piston rod and through an opening 17 in the splash plate and an opening 18 in the cap, the edges of which are reenforced by an annular guide flange 19.

Slidable on the lower end of the rod 8 and supported against the end of the sleeve 16 by a spring 20 is a valve 21 comprising a flat ring extending radially sufficiently to cover the inner group of ports 15 in the disk 12, the outer edge of the ring being spaced inwardly from the ports 14.

Slidably mounted on the sleeve adjacent the lower end thereof is an annular valve 22 comprising an annulus 23 adapted to overlie the outer ring of ports 13, and a spider 24 comprising arms 25 extending inwardly and angularly from the annulus and a bar portion 26 having an opening 27 axial of the annulus for mounting the valve on the sleeve.

Nuts 28 engaged with a threaded portion 29 of the sleeve retain a spring 30 coiled thereon and bearing against the spider of the valve, whereby the sleeve is urged upwardly over the rod, the valve being supported normally by the piston disk. The support of the sleeve from the valve 21 and piston disk spaces the valve 21 from the ports 15, and the spacing is regulated by provision of a manually operable stop nut 31 threaded on a threaded portion 32 of the rod exterior to the cylinder, which engages the upper end of the sleeve.

An annular valve 33 similar to the valve 22 is slidably mounted on the rod in opposite position from that of the valve 22, and on the opposite side of the piston disk, and adapted to control the ports 14, the edges being spaced from the adjacent ports 13 and 15. The valve 33 is normally urged into engagement with the piston disk to close the ports 14 by a spring 34 coiled on the rod and anchored by nuts 35 movably fixed to the rod adjacent its end.

The angularly extending arms of the spider of the valve 22 provides for relative movements of the piston disk, valve 22 and valve 21, and particularly for movement of the valve 22 on the axis of the valve 21. The angularly extending spider arms of the sliding valves 22 and 33 further particularly provide for avoidance of closing of a port in a group within the annulus comprising a valve.

In the illustrated use of the device, the cylinder is provided with a suitable fluid and fixed in relation to the device to which it is to be applied, for example a scale and secured to the scale base, and the rod is connected to a movable member of the device, for example the stem of the scale. Movement of the stem upon applying an article to be weighed causes the rod to move downwardly in the cylinder, carrying the sleeve with it, the speed of movement being retarded by the relatively small area of the ports 15, and proportionately to the adjusted spacing of the valve 21 from said ports.

As the piston moves through the liquid, the pressure of liquid through the ports 13 moves the valve 22 away from the ports against the resistance of the spring 30, whereby retardation is diminished, and the piston and stem are permitted to move more rapidly. When the piston approaches the end of its travel, and the stem nears the position for indicating weight, the pressure of liquid is diminished, the spring 30 moves the valve to close the ports 13, and retardation is increased. The closing of the ports 13 checks the movement of the stem to prevent the weight-indicating parts from moving beyond the position for correct indication of the weight.

When the article to be weighed is removed, the return movement of the piston is retarded initially by reason of the relatively small area of the ports 15 through which the liquid may move, and pressure of liquid through the ports 14 moves the valve 33 away from said ports to increase the area for passage of liquid, for increasing the rate at which the piston may return toward original position.

The spring 34 tends to restore the valve to port-closing position as the piston nears the end of its upward travel, to bring about an increased retarding effect at the end of the stroke. The moving member therefore will come to rest normally in weight-indicating position and a member connected therewith, such as a weight-indicating member, will not move beyond the zero point of the scale.

What I claim and desire to secure by Letters Patent is:

1. A dashpot comprising a liquid-containing cylinder, a piston movable in the cylinder and provided with a plurality of ports, a sleeve extending in the cylinder, a piston rod in the sleeve and attached thereto, and spring-pressed means operable against opposite sides of the piston respectively controlling said ports.

2. A dash pot comprising a liquid-containing cylinder, a piston provided with a plurality of ports, a piston rod, a sleeve slidable on the rod, and spring-pressed means slidable on the sleeve and the rod for respectively controlling said ports.

3. A dash pot comprising a liquid-containing cylinder, a piston provided with a plurality of ports, a piston rod, a sleeve slidable on the rod, spring-pressed means slidable on the sleeve and the rod for respectively controlling said ports, and means for adjusting the tension of the springs.

4. A dash pot comprising a liquid-containing cylinder, a piston having a plurality of ports, a piston rod, a sleeve slidable on the rod, having a valve at its lower end controlling one of said ports, spring-pressed means slidable on the sleeve for controlling another of said ports, and spring-pressed means slidable on the rod for controlling another of said ports.

5. A dash pot comprising a liquid-containing cylinder, a piston having a plurality of ports, a piston rod, a sleeve slidable on the rod, a valve at the lower end of the sleeve rod and slidable on the rod for controlling one of said ports, spring-pressed means slidable on the sleeve for controlling another of said ports, and spring pressed means slidable on the rod for controlling another of said ports.

6. In a dash pot, a liquid-containing cylinder, a tubular valve support slidably supported for reciprocation in the cylinder, a rod adapted for connection with a movable member of the device to which the dash pot is applied and slidable in the tubular support, a disk secured to the rod and provided with ports, a plurality of valves on the support controlling selected ports, and a valve slidable on the rod below the disk controlling a selected port therein.

7. In a dash pot, a fixed liquid-containing cylinder having a cover, a tubular valve support slidable in the cover and provided with a plurality of valves, a rod adapted for connection with a movable scale member and slidable in the tubular support, a disk fixed to the rod below the tubular support and provided with a plurality of series of ports, and a valve slidable on the rod below the disk, said support valves and rod valve controlling selected series of ports.

8. In a dash pot device of the character described, a cylinder adapted for fixed support in relation to a scale, a rod fixed to a movable member of the scale and extending into the cylinder, a sleeve on the rod having a flat set valve at its lower end, a valve slidable on the sleeve, a valve slidable on the rod, a disk fixed on the rod above said last named valve and provided with ports respectively controlled by said rod valve and with ports controlled by the slidable valve on the sleeve, and means urging said valves toward the disk.

9. In a dash pot device of the character described, a cylinder adapted for fixed support in relation to a scale, a rod fixed to a movable member of the scale and extending into the cylinder, a sleeve on the rod having a flat set valve at its lower end, an annular valve slidable on the sleeve, an annular valve slidable on the rod, a disk fixed on the rod above said annular valve and provided with ports respectively controlled by said rod valve and with ports controlled by the slidable valve on the sleeve, and means urging said annular valves toward the disk.

10. In a dash pot device of the character described, a cylinder adapted for fixed support in relation to a scale, a rod fixed to a movable member of the scale and extending into the cylinder, a sleeve on the rod having a valve at its lower end, a valve slidable on the sleeve, a valve slidable on the rod, a disk fixed on the rod above said valve and provided with ports controlled by said valves and with ports controlled by the valve on the sleeve, means urging said valves toward the disk, and means for adjusting the spacing of said valve from the disk for controlling movement of liquid through said selected ports.

11. In a dash pot device of the character described, a liquid-containing cylinder adapted for fixed support, a rod adapted for attachment to a scale member and extending into the cylinder, a sleeve slidable on the rod, a disk fixed to the rod below the end of the sleeve and provided with a plurality of annular series of ports, and a plurality of annular valves controlling the respective ports and independently movable under pressure of liquid produced by reciprocation of the rod.

12. In a dash pot including a liquid containing cylinder, a piston in the cylinder having a plurality of ports, and a piston rod, a sleeve on the rod, and spring-pressed means related respectively to the sleeve and the rod and operable against opposite sides of the piston respectively controlling said ports.

13. In a dash pot of the character described, a liquid containing cylinder, a sleeve extending in the cylinder, a piston rod in the sleeve, a piston provided with a plurality of ports, valves operable against opposite sides of the piston for controlling selected ports, and a plurality of tensioning means anchored respectively to the sleeve and the rod for urging the valves toward the piston to control said selected ports.

14. In a dash pot device of the character described, a cylinder adapted for fixed support in relation to a scale, a rod member, a sleeve member on the rod and slidable in relation thereto, means for locking the sleeve to the rod, one of said members being adapted to be fixed to a movable member of the scale, a piston provided with a plurality of ports, and spring-pressed means for controlling selected ports.

15. In a dash pot including a liquid containing cylinder, a piston in the cylinder having a plurality of ports, spring-pressed means controlling one of the ports from one side of the piston, a second spring-pressed means controlling another port from the opposite side of the piston and manually operable screwthreaded means for varying the effective area of another port.

16. In a dash pot of the character described including a cylinder, a sleeve extending slidably in the cylinder, a piston rod extending through the sleeve and adjustably fixed thereto, and a valve fixed to the sleeve, a piston provided with a plurality of radially spaced annular series of ports, said valve controlling the inner series of ports, and spring-pressed means for controlling the other ports.

17. In a dash pot of the character described including a cylinder, a sleeve extending slidably in the cylinder, a piston rod extending through the sleeve and adjustably fixed thereto and a valve fixed to the sleeve, a piston provided with a plurality of ports including a port spaced inwardly from the other ports, said valve controlling said inner port, and spring-pressed means operating against opposite sides of the piston for controlling the outer ports.

18. In a dash pot including a liquid-containing cylinder and an apertured piston slidable in the cylinder, a sleeve member extending into the cylinder, a rod member in the sleeve, one of said members being secured to the piston, means including a valve on one of said members and a spring-pressed valve for controlling flow of liquid through the piston, and screwthreaded means for adjusting one of said valves.

19. A dash pot including a liquid containing cylinder, an apertured piston slidable in the cylinder, a sleeve member extending into the cylinder, a rod member in the sleeve, said members being adjustable with reference to each other and one of said members being fixed to the piston, a valve responsive to adjustment of said members for limiting flow of liquid through the piston, a spring pressed valve for controlling flow of liquid through the piston, and means for effecting adjustment of said members.

20. A dash pot including a liquid containing cylinder, an apertured piston movable in the cylinder, means for respectively limiting and controlling flow of liquid through the piston including a pair of members adjustable with reference to each other, one of said members being provided with a valve operable against one side of the piston, one of said members being fixed to the piston, a spring-pressed valve operable against the other side of the piston, and means for adjusting said members with reference to each other for regulating said flow-limiting valve.

In testimony whereof I affix my signature.

LERNA D. WALDEN.